Dec. 7, 1926.
J. J. DONAHUE
DRAFT HITCH
Filed June 22, 1922
1,610,214
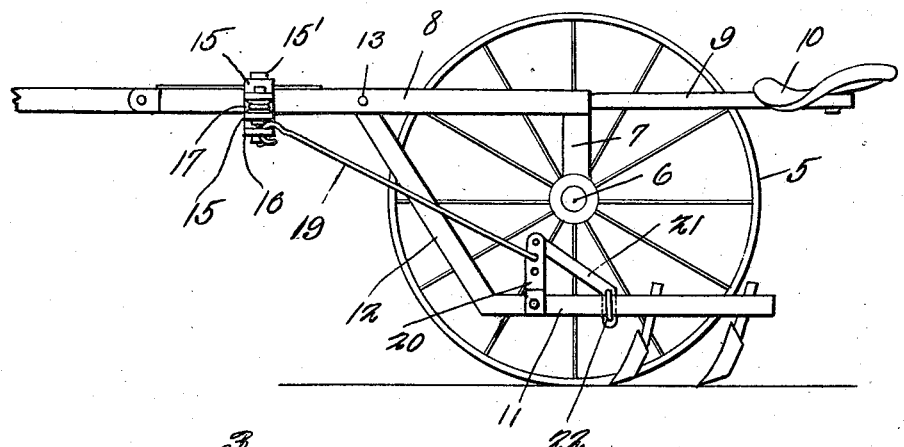
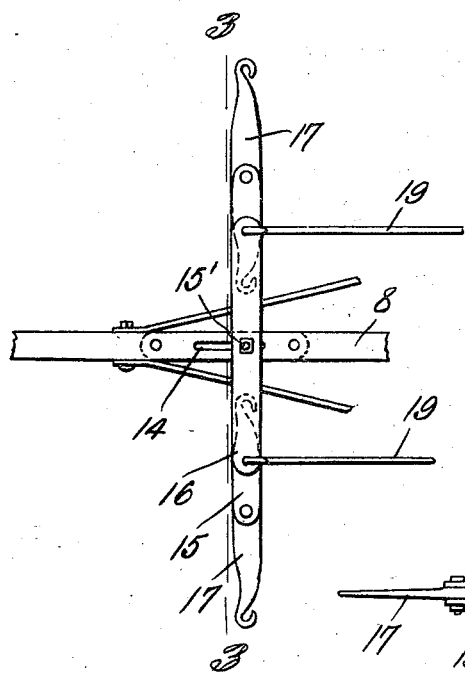
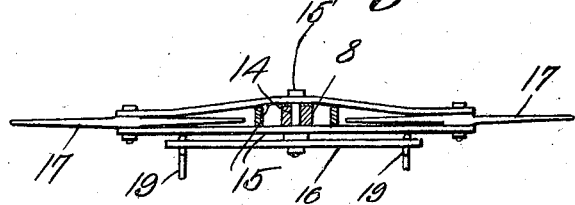
Inventor
J. J. Donahue Patented Dec. 7, 1926.

1,610,214

UNITED STATES PATENT OFFICE.

JAMES J. DONAHUE, OF WAUKON, IOWA.

DRAFT HITCH.

Application filed June 22, 1922. Serial No. 570,141.

This invention relates to farm machinery, and aims to provide novel means for directing the pull of the draft animals hitched thereto, directly to the frame, and implements supported thereby.

Another object of the invention is to provide means for adjusting the draft rods with respect to the implements supported by the frame of the machine, to insure the implements operating at proper depths.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view of a cultivator disclosing a device constructed in accordance with the present invention as applied thereto.

Figure 2 is a fragmental bottom plan view of the draft bar and draft rods.

Figure 3 is a sectional view taken on line 3—3 of Figure 2, the single-trees and their supporting bars being shown in elevation.

Referring to the drawing in detail, the invention is shown as applied to a cultivator but it is to be understood that the device may be applied to any farm machine wherein it is desired to equalize the pull of the draft animals. In the present showing the reference character 5 designates the supporting wheels of a machine, which are mounted on the shaft 6 that in turn has connection with the vertical bars 7 or body of the machine. The tongue 8 is secured to the body 7 in the usual and well known manner, the bar 9 being also secured to the body 7 which bar 9 supports the seat portion 10 of the machine.

The cultivator frame is indicated at 11, and has an upwardly extending bar 12 forming a part thereof, which bar connects with the tongue 8 as at 13. Formed in the tongue 8, is an elongated opening 14, which accommodates the draw-bolt 15′ carried by the bars 15 and bar 16, the draw-bolt being designed to secure the bars 15 and 16 together, but permit of movement thereof with respect to the tongue 8.

Pivotally supported between the bars 15 at points adjacent to the ends thereof, are the single-trees 17 which are formed with hook extremities to receive the trace ends, of a harness. The bar 16 has openings in the end thereof, which openings accommodate the hook extremities of the draft rods 19. These rods 19 extend downwardly and have their opposite ends disposed in suitable openings in the uprights 20 which have connection with the cultivator frame 11 as through the angular disposed bars 21 that are secured to the frame by means of the clevices 22. Thus it will be seen that the pull of the draft animals hitched to the cultivator is directed to the frame 11 to cause the blades carried thereby to operate at a proper depth.

Having thus described the invention, what is claimed as new is:—

In a cultivator construction, a wheel supported frame, a cultivator frame including side bars and upwardly extended front bars having connection with the wheel supported frame, uprights secured to the side bars and having a plurality of vertically spaced openings formed therein, rods having one of their respective ends positioned in one of the openings, a tongue forming a part of the wheel supported frame, said tongue having an elongated opening, a bar mounted under the tongue adjacent to the opening, a pair of bars mounted above the first mentioned bars and arranged on opposite sides of the tongue, a bolt passing through the bars and elongated opening to movably connect the bars to the tongue, single-trees mounted between the pair of bars, said rods having connection with the first mentioned bar at the ends thereof, said bars adapted to move longitudinally of the tongue to exert a pull on the rods to exert a direct pull on the cultivator frame.

In testimony that I claim the foregoing as my own, I have hereto affixed my signature.

JAMES J. DONAHUE.